(12) United States Patent
Katou et al.

(10) Patent No.: US 8,224,558 B2
(45) Date of Patent: Jul. 17, 2012

(54) INTERNAL COMBUSTION ENGINE CONTROL APPARATUS AND METHOD

(75) Inventors: Yuuichi Katou, Susono (JP); Tomohiro Shinagawa, Sunto-gun (JP); Shingo Korenaga, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 263 days.

(21) Appl. No.: 12/664,206

(22) PCT Filed: Jun. 12, 2008

(86) PCT No.: PCT/IB2008/001516
§ 371 (c)(1),
(2), (4) Date: Dec. 11, 2009

(87) PCT Pub. No.: WO2008/152486
PCT Pub. Date: Dec. 18, 2008

(65) Prior Publication Data
US 2010/0185380 A1 Jul. 22, 2010

(30) Foreign Application Priority Data
Jun. 13, 2007 (JP) ................. 2007-155922

(51) Int. Cl.
*F02D 41/12* (2006.01)
(52) U.S. Cl. ........ 701/110; 701/112; 123/325; 123/326; 123/436; 123/481; 123/493; 123/568.21
(58) Field of Classification Search .................. 123/320, 123/321, 325, 326, 345–348, 306, 481, 568.21, 123/493, 198 DB, 90.11, 90.15, 399, 436; 701/108, 110, 112
See application file for complete search history.

(56) References Cited

U.S. PATENT DOCUMENTS

| 6,966,303 | B2 * | 11/2005 | Harunari et al. | 123/478 |
| 6,973,785 | B2 * | 12/2005 | Umehara et al. | 60/605.2 |
| 7,296,561 | B2 * | 11/2007 | Shirakawa et al. | 123/493 |

(Continued)

FOREIGN PATENT DOCUMENTS

EP 1 004 760 5/2000

(Continued)

OTHER PUBLICATIONS

Japanese Office Action mailed on Jan. 26, 2011, issued for JP Application No. 2007-155922, filed on Jun. 13, 2007 (with English translation).

*Primary Examiner* — Hai Huynh
(74) *Attorney, Agent, or Firm* — Oblon, Spivak, McClelland, Maier & Neustadt, L.L.P.

(57) ABSTRACT

An internal combustion engine control apparatus includes a fuel supplying mechanism supplying fuel to the internal combustion engine; an exhaust gas recirculating mechanism recirculating exhaust gas of the internal combustion engine to an intake side of the internal combustion engine; a flow adjuster selectively increasing and decreasing a strength of flow of the supplied fuel and the recirculated exhaust gas in a cylinder of the internal combustion engine; a stop controller controlling the fuel supplying mechanism to stop the supply of fuel and controlling the exhaust gas recirculating mechanism to stop the recirculation of exhaust gas, when the internal combustion engine is operated in a predetermined deceleration mode; and in-cylinder flow controller controlling the flow adjuster to increase the strength of the flow when the control to stop the supply of fuel is cancelled.

20 Claims, 8 Drawing Sheets

U.S. PATENT DOCUMENTS

| | | |
|---|---|---|
| 7,349,791 B2 * | 3/2008 | Nishikiori et al. ............ 701/108 |
| 7,398,148 B2 * | 7/2008 | Yoshioka et al. ............. 701/103 |
| 2002/0139357 A1 | 10/2002 | Kawaguchi et al. |
| 2003/0056752 A1 | 3/2003 | Sukegawa et al. |
| 2008/0059031 A1 | 3/2008 | Yasui |
| 2008/0173277 A1 | 7/2008 | Otterspeer et al. |
| 2010/0186726 A1 * | 7/2010 | Takagi ..................... 123/568.16 |
| 2010/0262356 A1 * | 10/2010 | Maruyama ................... 701/103 |

FOREIGN PATENT DOCUMENTS

| | | |
|---|---|---|
| EP | 1 801 393 | 6/2007 |
| EP | 1 925 802 | 5/2008 |
| JP | 6-123258 | 5/1994 |
| JP | 11-101144 A | 4/1999 |
| JP | 2002-047951 A | 2/2002 |
| JP | 2002 89302 | 3/2002 |
| JP | 2002-089305 A | 3/2002 |
| JP | 2002-227687 A | 8/2002 |
| JP | 2003-293863 A | 10/2003 |
| JP | 2005 171871 | 6/2005 |
| JP | 2006 144685 | 6/2006 |
| JP | 2006-161588 A | 6/2006 |
| JP | 2006-249980 A | 9/2006 |
| WO | 2006 096429 | 9/2006 |
| WO | 2007 129160 | 11/2007 |

* cited by examiner

INTERNAL COMBUSTION ENGINE CONTROL APPARATUS AND METHOD

BACKGROUND OF THE INVENTION

1. Field of the Invention

The invention relates to an internal combustion engine control apparatus and method that can selectively increase and decrease the flow strength of fuel and air and the like in a cylinder of an internal combustion engine mounted in a vehicle for example.

2. Description of the Related Art

One known internal combustion engine control apparatus controls the intake and exhaust of an internal combustion engine by changing the valve timing using a so-called variable valve timing (VVT) mechanism.

For example, Japanese Patent Application Publication No. 2005-171871 (JP-A-2005-171871) describes technology that prevents residual gas in a cylinder from increasing by changing the valve timing of an intake valve of an internal combustion engine when a vehicle is decelerating.

Moreover, this kind of technology that changes the valve timing is used to prevent the combustion state from deteriorating when returning from a fuel cut in an internal combustion engine with a fuel cut function.

For example, Japanese Patent Application Publication No. 2006-144685 (JP-A-2006-144685) describes technology that reduces the amount of residual gas by decreasing the amount of recirculated exhaust gas by changing the valve timing when returning from a fuel cut.

Also, Japanese Patent Application Publication No. 2002-89302 (JP-A-2002-89302) describes technology that increases the actual compression ratio by changing the valve timing when returning from a fuel cut.

However, because the residual gas, air, and fuel and the like is not sufficiently mixed in the cylinder, for example, by only reducing the amount of residual gas and increasing the actual compression ratio when returning from a fuel cut, as is done in the technologies described above, misfiring or the like may result. That is, with the foregoing technologies, it is difficult to sufficiently improve a deteriorated combustion state in an internal combustion engine.

SUMMARY OF THE INVENTION

This invention thus provides an internal combustion engine control apparatus and method capable of improving a deteriorated combustion state in an internal combustion engine when returning from a fuel cut.

A first aspect of the invention relates to an internal combustion engine control apparatus that is includes fuel supplying means for supplying fuel to the internal combustion engine; exhaust gas recirculating means for recirculating exhaust gas of the internal combustion engine to an intake side of the internal combustion engine; flow adjusting means for selectively increasing and decreasing a strength of flow of the supplied fuel and the recirculated exhaust gas in a cylinder of the internal combustion engine; stop controlling means for controlling the fuel supplying means to stop the supply of fuel and controlling the exhaust gas recirculating means to stop the recirculation of exhaust gas, when the internal combustion engine is operated in a predetermined deceleration mode; and in-cylinder flow controlling means for controlling the flow adjusting means to increase the strength of the flow when the control to stop the supply of fuel is cancelled.

According to this structure, fuel is supplied to the internal combustion engine by the fuel supplying means when the internal combustion engine is operated. Also, exhaust gas is recirculated to the intake side of the internal combustion engine by the exhaust gas recirculating means. As a result, for example, pumping loss can be reduced thus improving fuel efficiency. Also, the strength of the flow of the supplied fuel and the recirculated exhaust gas in the cylinder can be selectively increased and reduced by the flow adjusting means.

With this structure, the stop controlling means controls the fuel supplying means so that it stops supplying fuel (hereinafter appropriately referred to as a "fuel cut") and controls the exhaust gas recirculating means to stop recirculating exhaust gas, particularly when the internal combustion engine is operated in the predetermined deceleration mode. Performing a fuel cut prevents fuel from being needlessly consumed (i.e., wasted) and thus improves fuel efficiency. Also, exhaust gas stops being recirculated so the exhaust gas that remains in the cylinder (hereinafter appropriately referred to as "residual gas") can be prevented from increasing during the fuel cut.

Moreover, when the fuel cut is cancelled, the in-cylinder flow controlling means controls the flow adjusting means to increase the strength of the flow in the cylinder of the internal combustion engine. Increasing the strength of the flow in the cylinder of the internal combustion engine in this way enables the fuel that starts to be supplied when the fuel cut is cancelled to better mix with the residual gas, which helps to prevent misfiring or the like. Also, as a result, even when the amount of recirculated exhaust gas is large, stable combustion can be performed (i.e., the ability to tolerate exhaust gas recirculation (EGR) improves) which further improves fuel efficiency.

As described above, with the internal combustion engine control apparatus of the invention, it is possible to improve the combustion state when it has deteriorated from residual gas, by increasing the strength of the flow in the cylinder when a fuel cut is cancelled.

In the first aspect, the flow adjusting means may include an intake valve which is provided on the intake side of the internal combustion engine and structured so as to be able to change at least one valve timing from among of a valve opening timing and a valve closing timing, and the supplied fuel and the recirculated exhaust gas may flow into the cylinder via the intake valve. Also, the in-cylinder flow controlling means may change at least one valve timing from among the valve opening timing and the valve closing timing to increase the strength of the flow.

Accordingly, the supplied fuel and the recirculated exhaust gas, as well as air drawn in from the outside and the like flow into the cylinder via this intake valve.

According to this structure, the in-cylinder flow controlling means changes at least one valve timing from among the valve opening timing and the valve closing timing in order to increase the strength of the flow in the cylinder of the internal combustion engine. That is, by changing the valve timing of the intake valve, the inflow of fuel and air and the like into the cylinder can be controlled such that the strength of the flow in the cylinder increases. Accordingly, the fuel and the residual gas can be better mixed when the fuel cut is cancelled.

As described above, with the internal combustion engine control apparatus having this structure, it is possible to improve the combustion state when a fuel cut is cancelled by controlling the valve timing of the intake valve.

In the foregoing structure, the in-cylinder flow controlling means may retard the valve opening timing to increase the strength of the flow. More specifically, the in-cylinder flow controlling means may retard the valve opening timing with respect to top dead center to increase the strength of the flow.

According to this structure, the opening timing of the intake valve is retarded so the negative pressure in the cylinder at the valve opening timing is increased. As a result, an even stronger flow is created in the cylinder by the inflow of fuel and air and the like, which enables the fuel, air, and residual gas and the like in the cylinder to sufficiently mix. Accordingly, the combustion state when a fuel cut is cancelled can be improved by relatively simple control.

In the foregoing structure, the in-cylinder flow controlling means may shift the valve closing timing toward bottom dead center of the piston of the internal combustion engine to increase the strength of the flow.

Shifting the valve closing timing toward bottom dead center of the piston in this way increases the actual compression ratio within the cylinder. As a result, the compression end temperature also increases which helps to prevent misfiring and the like. Accordingly, the combustion state when a fuel cut is cancelled can be improved by relatively simple control.

The internal combustion engine control apparatus having the structure described above may also include first residual exhaust gas amount calculating means for calculating a first residual exhaust gas amount which is the amount of the recirculated exhaust gas remaining in the cylinder, when the control to stop the supply of fuel is cancelled. Also, the in-cylinder flow controlling means may control the flow adjusting means according to the first residual exhaust gas amount.

The in-cylinder flow controlling means increases the flow in the cylinder as the calculated first residual exhaust gas amount increases.

Performing control according to the first residual exhaust gas amount enables the fuel and the residual gas to better mix. As a result, the combustion state when a fuel cut is cancelled can be even more effectively improved.

The internal combustion engine control apparatus having the structure described above may also include second residual exhaust gas amount calculating means for calculating a second residual exhaust gas amount which is the amount of the recirculated exhaust gas remaining in the cylinder right before the supply of fuel is stopped. Also, the first residual exhaust gas amount calculating means may calculate the first residual exhaust gas amount based on the second residual exhaust gas amount.

Calculating the second residual exhaust gas amount makes it possible to calculate the first residual exhaust gas amount based on the rate of change in the residual gas during the fuel cut, and the like. That is, the first residual exhaust gas amount can be calculated more easily and accurately. As a result, the combustion state of the internal combustion engine can be more effectively improved.

In the foregoing structure, the exhaust gas recirculating means may include a recirculation valve with an adjustable opening amount, and selectively change the amount of recirculated exhaust gas by changing the opening amount of the recirculation valve, and the second residual exhaust gas amount calculating means may calculate the second residual exhaust gas amount based on the opening amount of the recirculation valve.

According to this structure, the amount of exhaust gas recirculated up until right before the fuel cut starts can be obtained from the opening amount of the recirculation valve right before the fuel cut starts. Then the second residual exhaust gas amount can be calculated using that amount of recirculated exhaust gas.

As described above, the second residual exhaust gas amount can be more easily and accurately calculated when it is calculated based on the opening amount of the recirculation valve of the exhaust gas recirculating means.

In the foregoing structure, the first residual exhaust gas amount calculating means may calculate the first residual exhaust gas amount based on the second residual exhaust gas amount and the number of cycles of the piston of the internal combustion engine while the supply of fuel is stopped.

According to this structure, the amount of ventilation in the cylinder (i.e., the amount of air and the like supplied and discharged to and from the cylinder) of the internal combustion engine can be obtained from the number of cycles of the piston of the internal combustion engine during the fuel cut, and the amount that the residual gas has decreased during the fuel cut can be obtained from the amount of ventilation. The first residual exhaust gas amount can then be obtained by subtracting the amount that the residual gas has decreased from the second residual exhaust gas amount.

As described above, the first residual exhaust gas amount can be more easily and accurately calculated when it is calculated based on the second residual exhaust gas amount and the number of cycles of the piston of the internal combustion engine during the fuel cut. As a result, the combustion state of the internal combustion engine can be more effectively improved.

In the foregoing structure, the first residual exhaust gas amount calculating means may calculate the first residual exhaust gas amount based on the second residual exhaust gas amount and the period of time during which the supply of fuel is stopped.

According to this structure, the first residual exhaust gas amount is calculated based on the second residual exhaust gas amount and the duration of the fuel cut. During the fuel cut the recirculation of exhaust gas is stopped so the amount of residual gas decreases over time when the internal combustion engine is driven. That is, the amount that the residual gas has decreased during the fuel cut can be obtained based on the duration of the fuel cut. Then the first residual exhaust gas amount can be obtained by subtracting the amount that the residual gas has decreased from the second residual exhaust gas amount.

As described above, the first residual exhaust gas amount can be more easily and accurately calculated when it is calculated based on the second residual exhaust gas amount and the duration of the fuel cut. As a result, the combustion state of the internal combustion engine can be more effectively improved.

In the foregoing structure, the first residual exhaust gas amount calculating means may calculate the first residual exhaust gas amount based on the second residual exhaust gas amount and the amount of air supplied to the internal combustion engine while the supply of fuel is stopped.

According to this structure, the first residual exhaust gas amount is calculated based on the second residual exhaust gas amount and the amount of air supplied to the internal combustion engine during the fuel cut. For example, the amount of ventilation in the cylinder of the internal combustion engine can be obtained from the amount of air supplied to the internal combustion engine during the fuel cut, and the amount that the residual gas has decreased during the fuel cut can be obtained from the amount of ventilation. The first residual exhaust gas amount can then be obtained by subtracting the amount that the residual gas has decreased from the second residual exhaust gas amount.

As described above, the first residual exhaust gas amount can be more easily and accurately calculated when it is calculated based on the second residual exhaust gas amount and the amount of air supplied to the internal combustion engine during the fuel cut. As a result, the combustion state of the internal combustion engine can be more effectively improved.

In the foregoing structure, the first residual exhaust gas amount calculating means may calculate the first residual exhaust gas amount based on the second residual exhaust gas amount and the revolution count of the internal combustion engine while the supply of fuel is stopped.

According to this structure, the first residual exhaust gas amount is calculated based on the second residual exhaust gas amount and the revolution count of the internal combustion engine during the fuel cut. For example, the amount of ventilation in the cylinder of the internal combustion engine can be obtained from the revolution count of the internal combustion engine during the fuel cut, and the amount that the residual gas has decreased during the fuel cut can be obtained from the amount of ventilation. The first residual exhaust gas amount can then be obtained by subtracting the amount that the residual gas has decreased from the second residual exhaust gas amount.

As described above, the first residual exhaust gas amount can be more easily and accurately calculated when it is calculated based on the second residual exhaust gas amount and the revolution count of the internal combustion engine during the fuel cut. As a result, the combustion state of the internal combustion engine can be more effectively improved.

In the foregoing structure, the in-cylinder flow controlling means may set the period of time during which the valve opening timing and the valve closing timing when the control to stop the supply of fuel is cancelled are maintained, and may calculate the period of time based on the first residual exhaust gas amount.

A second aspect of the invention relates to an internal combustion engine control apparatus that includes fuel supplying means for supplying fuel to the internal combustion engine; exhaust gas recirculating means for recirculating exhaust gas of the internal combustion engine to an intake side of the internal combustion engine; flow adjusting means for selectively increasing and decreasing a strength of flow of the supplied fuel and the recirculated exhaust gas in a cylinder of the internal combustion engine; stop controlling means for independently performing i) control on the fuel supplying means to stop the supply of fuel and ii) control on the exhaust gas recirculating means to stop the recirculation of exhaust gas; and in-cylinder flow controlling means for controlling the flow adjusting means to increase the strength of the flow at least when canceling the control to stop the supply of fuel. The stop controlling means performs control to stop the supply of fuel and control to stop the recirculation of exhaust gas, when the internal combustion engine is operated in a predetermined deceleration mode.

A third aspect of the invention relates to an internal combustion engine control method of controlling an internal combustion engine provided with fuel supplying means for supplying fuel to the internal combustion engine; exhaust gas recirculating means for recirculating exhaust gas of the internal combustion engine to an intake side of the internal combustion engine; and flow adjusting means for selectively increasing and decreasing a strength of flow of the supplied fuel and the recirculated exhaust gas in a cylinder of the internal combustion engine. This internal combustion engine control method includes controlling the fuel supplying means to stop the supply of fuel and controlling the exhaust gas recirculating means to stop the recirculation of exhaust gas, when the internal combustion engine is operated in a predetermined deceleration mode; and controlling the flow adjusting means to increase the strength of the flow when the control to stop the supply of fuel is cancelled.

According to this structure, the combustion state of the internal combustion engine when a fuel cut is cancelled can be improved.

Incidentally, the internal combustion engine control method of the invention may also employ various forms similar to the various structures of the internal combustion engine control apparatus of the invention described above. That is, the internal combustion engine control method of the invention may also be modified in the same ways that the internal combustion engine control apparatus of the invention described above is modified.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein.

DETAILED DESCRIPTION OF THE EMBODIMENTS

Hereinafter, example embodiments of the invention will be described with reference to the accompanying drawings. In the following example embodiment, the internal combustion engine control apparatus of the invention is applied to an internal combustion engine of a vehicle.

First, the structure of an engine, which is one example of the internal combustion engine of the invention to which the internal combustion engine control apparatus according to this example embodiment is applied, will be described with reference to FIG. 1, which is a schematic view of the structure of the engine.

Figure 1:
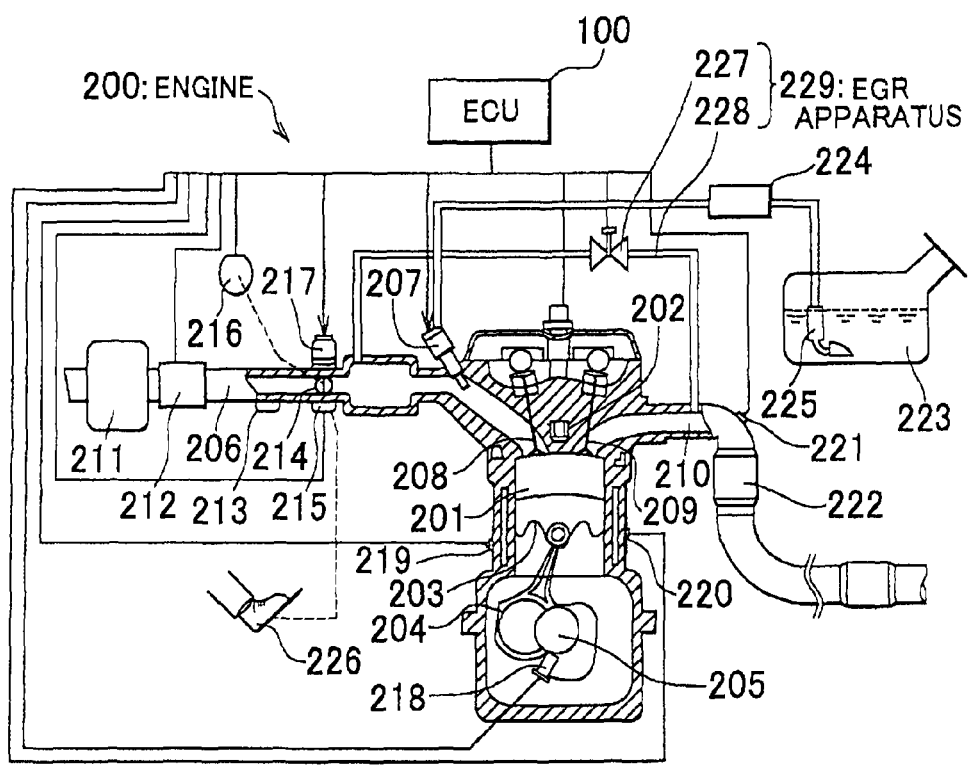
FIG. 1 is a schematic diagram of the structure of an engine according to an example embodiment of the invention.

In the engine 200 shown in FIG. 1, a spark plug 202 ignites an air-fuel mixture in a cylinder 201, causing the mixture to combust. The force of this combustion drives a piston 203 back and forth in a reciprocal motion which is converted into rotary motion of a crankshaft 205 by a connecting rod 204. The engine 200 is provided in, for example, a vehicle using only the engine 200 as the power source, or a hybrid vehicle that uses both the engine 200 and an electric motor as power sources, or the like. Also, the engine 200 generates power by burning a gasoline or alcohol fuel.

When combusting fuel in the cylinder 201, air that has been drawn in from the outside flows through an intake pipe 206 and mixes with fuel injected from a fuel injector 207, which is one example of fuel supplying means of the invention, to form an air-fuel mixture. The fuel is supplied to the fuel injector 207 from a fuel tank 223 via a filter 224. Incidentally, a fuel sensor 225 for detecting the amount of fuel remaining is arranged in the fuel tank 223.

Communication between the intake pipe 206 and the cylinder 201 is controlled by opening and closing an intake valve 208, which is an example of flow adjusting means of the invention. In this example embodiment, the intake valve 208 may include an electromagnetic or mechanical variable valve timing mechanism. Once combusted in the cylinder 201, the air-fuel mixture becomes exhaust gas that is then discharged via an exhaust pipe 210. Communication between the exhaust pipe 210 and the cylinder 201 is controlled by an exhaust valve 209 opening and closing in conjunction with the opening and closing of the intake valve 208.

An air-cleaner 211 is arranged in an upstream portion of the intake pipe 206 so that air drawn in from the outside is purified. An airflow meter 212 is arranged downstream (i.e., on the side closer to the cylinder) of the air cleaner 211. The airflow meter 212 is a hot-wire type airflow meter that directly measures the mass flowrate of air that is drawn in. In addition, an intake air temperature sensor 213 for detecting the temperature of the intake air is also provided in the intake pipe 206.

Downstream of the airflow meter 212 in the intake pipe 206 is a throttle valve 214 that adjusts the intake air amount that flows into the cylinder 201. This throttle valve 214 is electrically connected to a throttle position sensor 215 that can detect the opening amount of the throttle valve 214. Moreover, an accelerator position sensor 216 that detects the depression amount of an accelerator pedal 226 by a driver, and a throttle valve motor 217 that drives the throttle valve 214 are provided near the throttle valve 214.

A crank position sensor 218 that detects the rotational position of a crankshaft 205 is arranged near the crankshaft 205. The crank position sensor 218 can obtain the position of the piston 203 in the cylinder 201, and the speed of the engine 200, and the like based on the rotation state of the crankshaft 205. Also, a knock sensor 219 capable of measuring the knocking strength of the engine 200 is arranged in a cylinder block that houses the cylinder 201, and a coolant temperature sensor 220 is arranged in a water jacket provided in the cylinder block.

A three-way catalyst 222 is arranged in the exhaust pipe 210. This three-way catalyst 222 is a catalyst that is capable of purifying CO (carbon monoxide), HC (hydrocarbons), and $NO_x$ (oxides of nitrogen) discharged from the engine 200. Also, an air-fuel ratio sensor 221 which detects the air-fuel ratio in the engine 200 from the exhaust gas discharged from the exhaust pipe 210 is arranged in the exhaust pipe 210 upstream (i.e., on the side closer to the cylinder) of the three-way catalyst 222.

The intake pipe 206 and the exhaust pipe 210 are connected together by an EGR (Exhaust Gas Recirculation) passage 228. An EGR control valve 227, which is one example of the recirculation valve of the invention, is provided in this EGR passage 228. This EGR control valve 227 controls the amount of EGR introduced from the exhaust pipe 210 into the intake pipe 206 by opening and closing. The EGR passage 228 and the EGR control valve 227 together constitute an EGR apparatus 229 which is one example of exhaust gas recirculating means of the invention.

An ECU (Electronic Control Unit) 100 is provided which controls the overall operation of the engine system by performing various calculations and outputting electric signals and the like. This ECU 100 is one example of stop controlling means, in-cylinder flow controlling means, first residual exhaust gas amount calculating means, and second residual exhaust gas amount calculating means of the invention.

Figure 2:
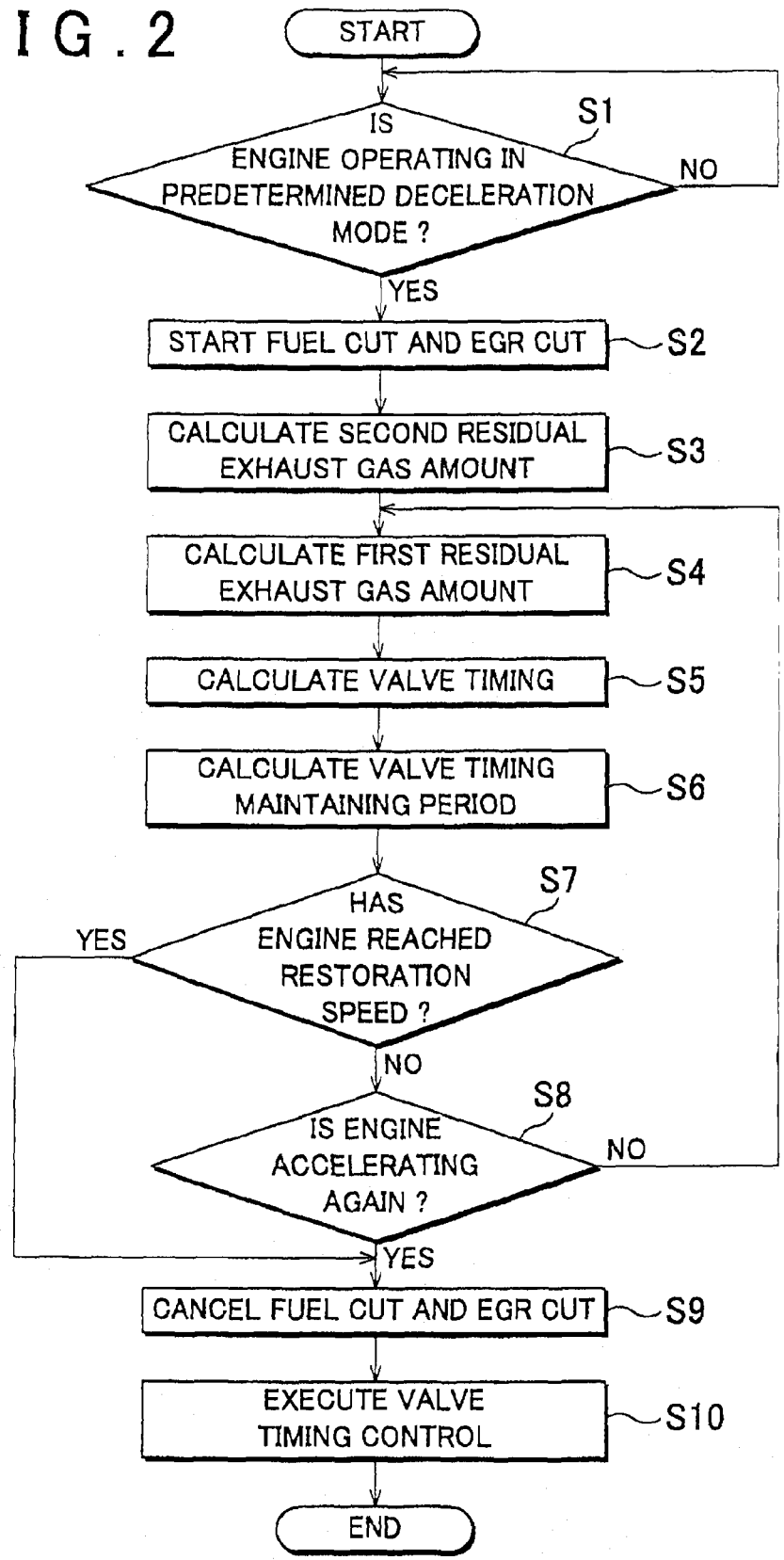
FIG. 2 is a flowchart illustrating operation of an internal combustion engine control apparatus according to the example embodiment of the invention.

Next, the operation and effects of the internal combustion engine control apparatus according to this example embodiment will be described with reference to FIGS. 2 to 8 in addition to FIG. 1. FIG. 2 is a flowchart illustrating the operation of the internal combustion engine control apparatus.

As shown in FIG. 2, when operation of the internal combustion engine control apparatus according to this example embodiment starts, the ECU 100 first determines whether the vehicle is in a predetermined deceleration mode or whether there is a demand for the vehicle to be in the predetermined deceleration mode, according to the speed of the engine 200 and the like (step S1). The predetermined deceleration mode in this case is a mode in which there is a demand for deceleration in which the engine is able to operate without fuel being supplied. If the vehicle is not in this predetermined deceleration mode or there is no demand for the vehicle to be in the predetermined deceleration mode (i.e., NO in step S1), step S1 is repeated. If, on the other hand, the vehicle is in the predetermined deceleration mode or there is a demand for the vehicle to be in the predetermined deceleration mode (i.e., YES in step S1), a fuel cut is performed (i.e., fuel stops being supplied from the fuel injector 207) and exhaust gas recirculation by the EGR apparatus 229 is stopped by closing the EGR control valve 227 (step S2). The fuel cut and the stopping of exhaust gas recirculation are typically performed simultaneously but they may also be performed one after the other with a certain amount of time in between.

Next, the ECU 100 calculates a second residual exhaust gas amount as the amount of residual gas right before the fuel cut starts (step S3). Methods for calculating the second residual exhaust gas amount will now be described in detail with reference to FIGS. 3A and 3B which are graphs each showing a second residual exhaust gas amount calculation method.

Figure 3A:
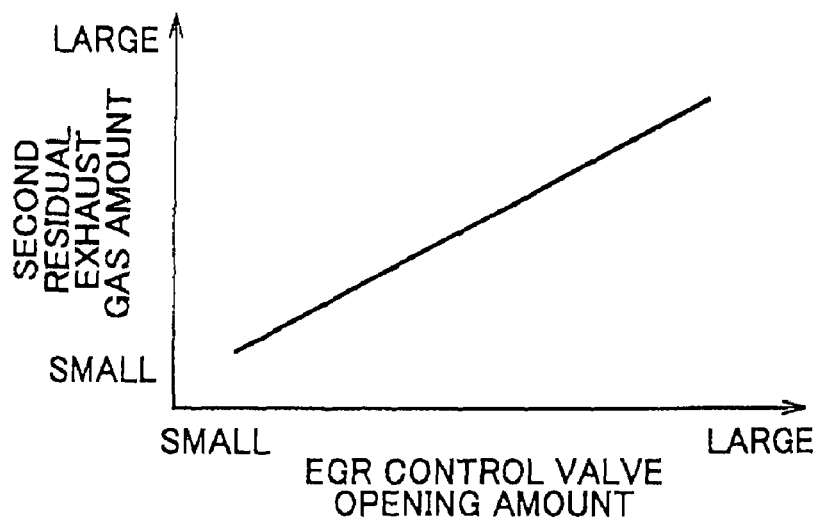
FIGS. 3A and 3B are graphs showing calculation methods for a second residual exhaust gas amount according to the example embodiment of the invention.
Figure 3B:
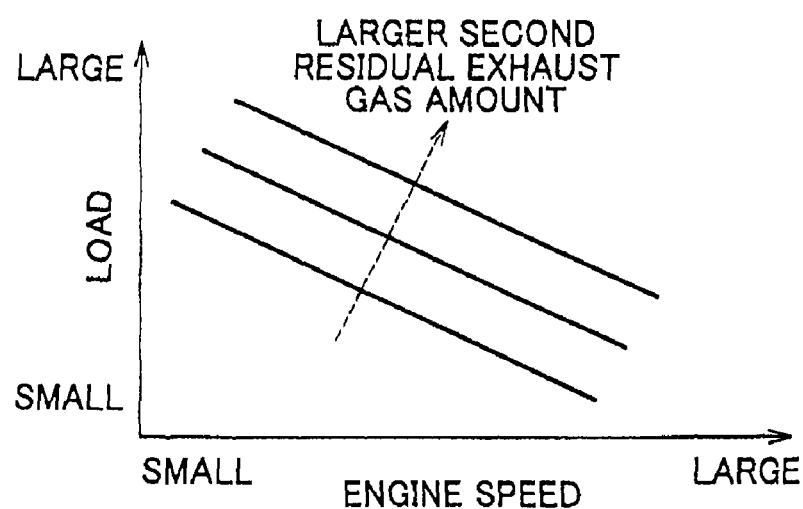

The amount of residual gas right before a fuel cut starts is thought to increase the larger (i.e., wider) the opening amount of the EGR control valve 227 is right before the fuel cut starts, for example. Therefore, as shown in FIG. 3A, the second residual exhaust gas amount can be calculated such that it is substantially proportional to the opening amount of the EGR control valve 227 right before the fuel cut starts. Incidentally, taking other conditions into account, the second residual exhaust gas amount may also be calculated using a more complex mathematical expression or the like, or it may be calculated from the relationship obtained by simulation or the like.

Also, the amount of residual gas right before a fuel cut starts is thought to also be larger the higher both the load and speed of the engine 200 are right before the fuel cut starts. Accordingly, equivalent lines of the second residual exhaust gas amount are as shown by the solid lines in the graph in FIG. 3B. To calculate the second residual exhaust gas amount in this way as well, a more complex mathematical expression or a relationship obtained by simulation or the like may also be used, as described above.

Incidentally, the methods for calculating the second residual exhaust gas amount described above are only examples. For example, the second residual exhaust gas amount may also be calculated by combining these methods or by another method entirely.

Returning now to FIG. 2, once the second residual exhaust gas amount is calculated, the ECU 100 then calculates a first residual exhaust gas amount which is the amount of residual gas when the fuel cut is cancelled (step S4). Methods for calculating the first residual exhaust gas amount will now be described in detail with reference to FIGS. 4A and 4B which are graphs each showing a first residual exhaust gas amount calculation method.

Figure 4A:
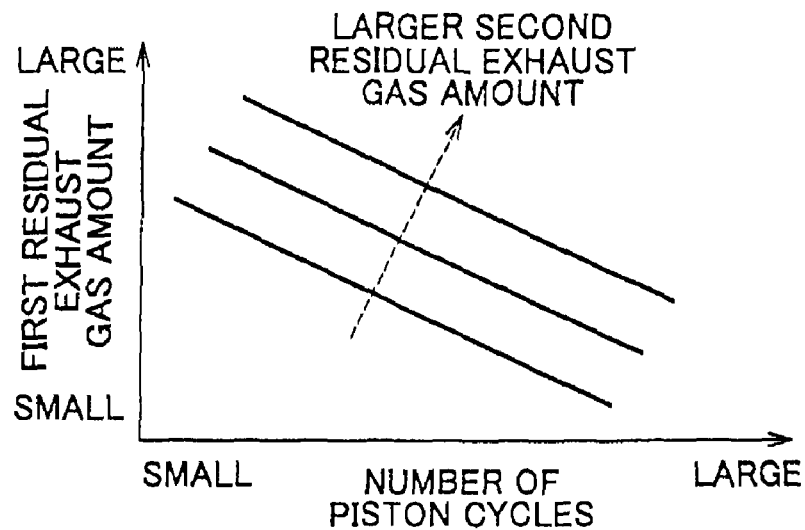
FIGS. 4A and 4B are graphs showing calculation methods for a first residual exhaust gas amount according to the example embodiment of the invention.

The relationship between the first residual exhaust gas amount and the number of cycles of the piston 203 is as shown in the graph in FIG. 4A. That is, the first residual exhaust gas amount decreases as the number of cycles of the piston 203 increases. This is because air in the cylinder 203 is ventilated (i.e., changed or supplied and discharged) with each cycle of the piston 203. Also, the first residual exhaust gas amount also increases the greater the second residual exhaust gas amount is. Therefore, the first residual exhaust gas amount can be calculated based on the number of cycles of the piston 203 and the second residual exhaust gas amount.

Figure 4B:
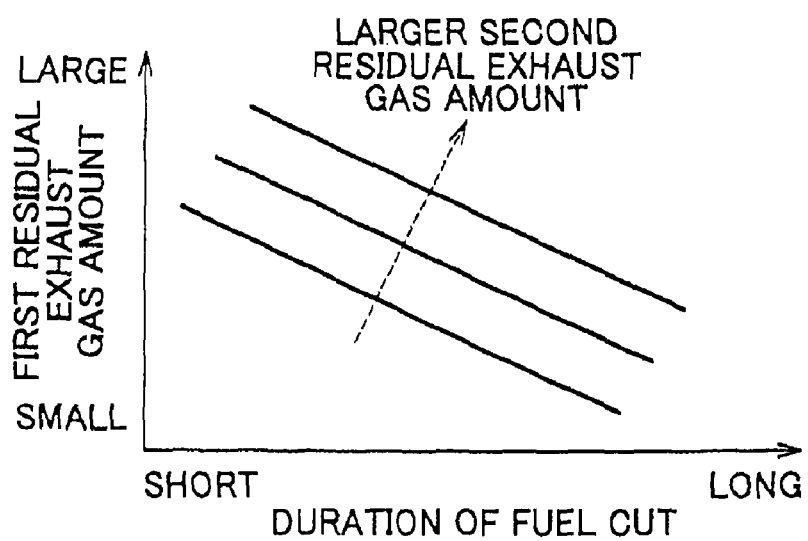

The relationship between the residual exhaust gas amount and the period of time during which the fuel cut is performed, is as shown in the graph in FIG. 4B. That is, the first residual exhaust gas amount decreases the longer the duration of the fuel cut is. This is because during the fuel cut, exhaust gas stops being recirculated by the EGR apparatus 229 so the amount of residual gas does not increase. Also, as in the example described above, the first residual exhaust gas amount also increases the greater the second residual exhaust gas amount is. Therefore, the first residual exhaust gas amount can be calculated based on the period of time during which the fuel cut is performed and the second residual exhaust gas amount.

Incidentally, although not described above, the first residual exhaust gas amount can also be calculated according to the total amount of air supplied to the cylinder 201 or the revolution count of the engine 200 or the like during the fuel cut. Moreover, calculating the first residual exhaust gas mount using a plurality of methods also increases the accuracy of the calculated value.

As shown in FIG. 2, once the first residual exhaust gas amount has been calculated, the ECU 100 then calculates how much the valve timing of the intake valve 208 will change based on that calculated first residual exhaust gas amount (step S5). A method for calculating the valve timing when returning from a fuel cut will now be described in detail with reference to FIG. 5, which is a graph showing the relationship between the first residual exhaust gas amount and the opening timing of the intake valve.

Figure 5:
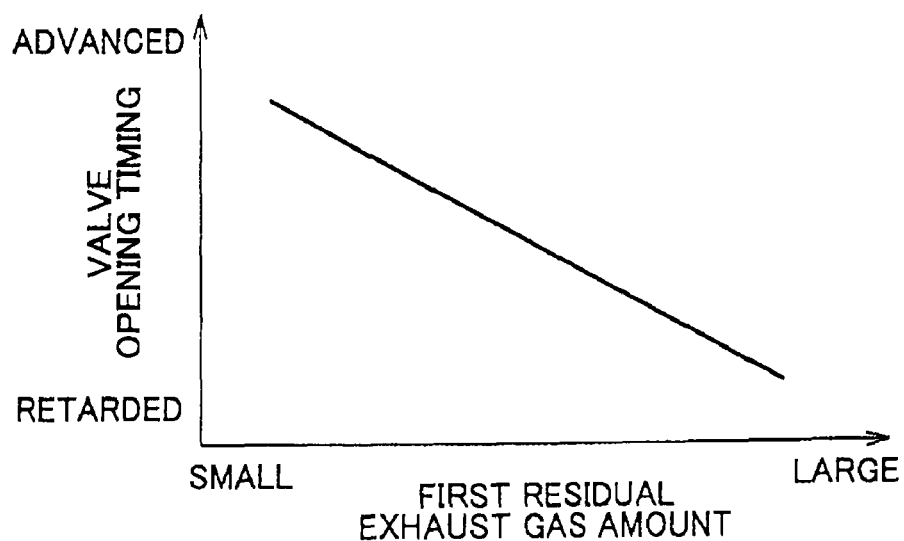
FIG. 5 is a graph showing the relationship between the first residual exhaust gas amount and the opening timing of an intake valve according to the example embodiment of the invention.

As shown in FIG. 5, the opening timing of the intake valve 208 is calculated to be a value that retards the opening timing more the greater the first residual exhaust gas amount is. As a result, when the first residual exhaust gas amount is large, the strength of the flow inside the cylinder 201 increases even more. Incidentally, the flow inside the cylinder 201 refers to the spiral flow that promotes the mixture of fuel and air (including the recirculated exhaust gas described above). Examples of this kind of spiral flow include swirl (lateral rotation) and tumble (vertical rotation) and the like. Typically, knocking is more likely to occur when the valve opening timing is retarded, but when there is a large amount of residual gas the combustion temperature decreases so the probability that knocking will occur is low, even if control such as that described above is performed.

Meanwhile, the closing timing of the intake valve 208 is calculated to be a value that shifts the closing timing closer to bottom dead center (BDC) of the piston 203 the greater the first residual exhaust gas amount is. As a result, when the first residual amount is large, the actual compression ratio increases even more. Incidentally, either one or the other of the valve opening timing and the valve closing timing may be calculated. Also, the valve lift amount, for example, may be calculated instead of the valve opening timing and the valve closing timing.

As shown in FIG. 2, once the valve timing has been calculated, the ECU 100 then calculates the period of time for which the calculated valve timing is maintained (step S6). A method for calculating the valve timing maintaining period is described in detail with reference to FIG. 6, which is a graph showing the relationship between the first residual amount and the valve timing maintaining period.

Figure 6:
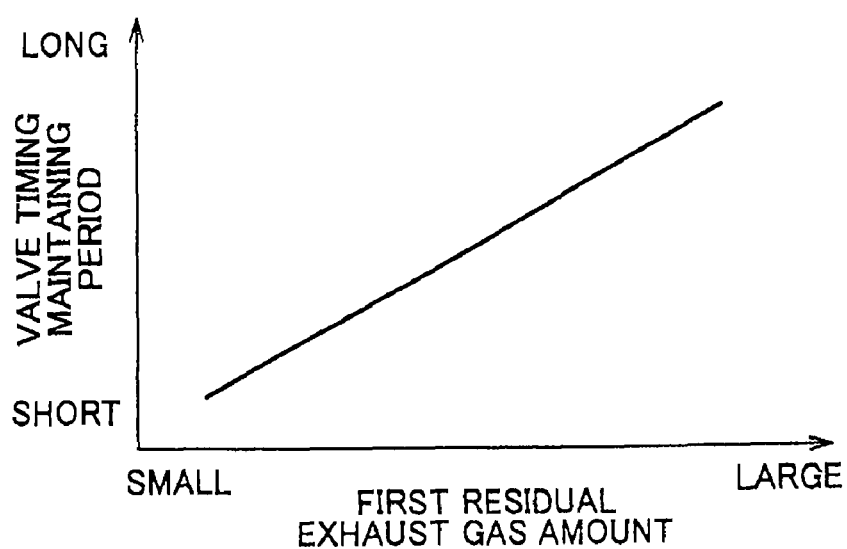
FIG. 6 is a graph showing the relationship between the first residual exhaust gas amount and the period of time during which the valve timing (VT) is maintained according to the example embodiment of the invention.

As shown in FIG. 6, the valve timing maintaining period is calculated to become longer the larger the first residual amount is. That is, when there is a large amount of residual gas, it is conceivable that the combustion state has further deteriorated so the valve timing maintaining period is increased to increase the period during which the combustion state can be improved.

As shown in FIG. 2, once the valve timing maintaining period has been calculated, the ECU 100 determines whether the engine 200 has reached a restoration speed (step S7). This restoration speed is the speed at which operation of the engine 200 can no longer be maintained unless the fuel cut is cancelled, for example, i.e., the speed at which the supply of fuel must be restored in order to keep the engine 200 operating. The value of this restoration speed is obtained either theoretically or empirically in advance. If it is determined that the engine 200 has reached the restoration speed (i.e., YES in step S7), then the process skips step S8 and proceeds on to step S9. That is, an operation will be performed to return the engine from the predetermined deceleration mode without accelerating again. If, on the other hand, it is determined that the engine 200 has not reached the restoration speed (i.e., NO in step S7), it is determined whether the vehicle has accelerated again (step S8). If it is determined here that the vehicle has accelerated again (i.e., YES in step S8), then the process proceeds on to step S9. That is, after the vehicle accelerates again, an operation is performed to return the engine from the predetermined deceleration mode to the normal operating mode. If, on the other hand, if is determined that the vehicle is not accelerating again (i.e., NO in step S8), the process returns to step S4. That is, steps S4 to S6 are repeated until either the engine 200 reaches the restoration speed or the vehicle is accelerated again.

Figure 7:
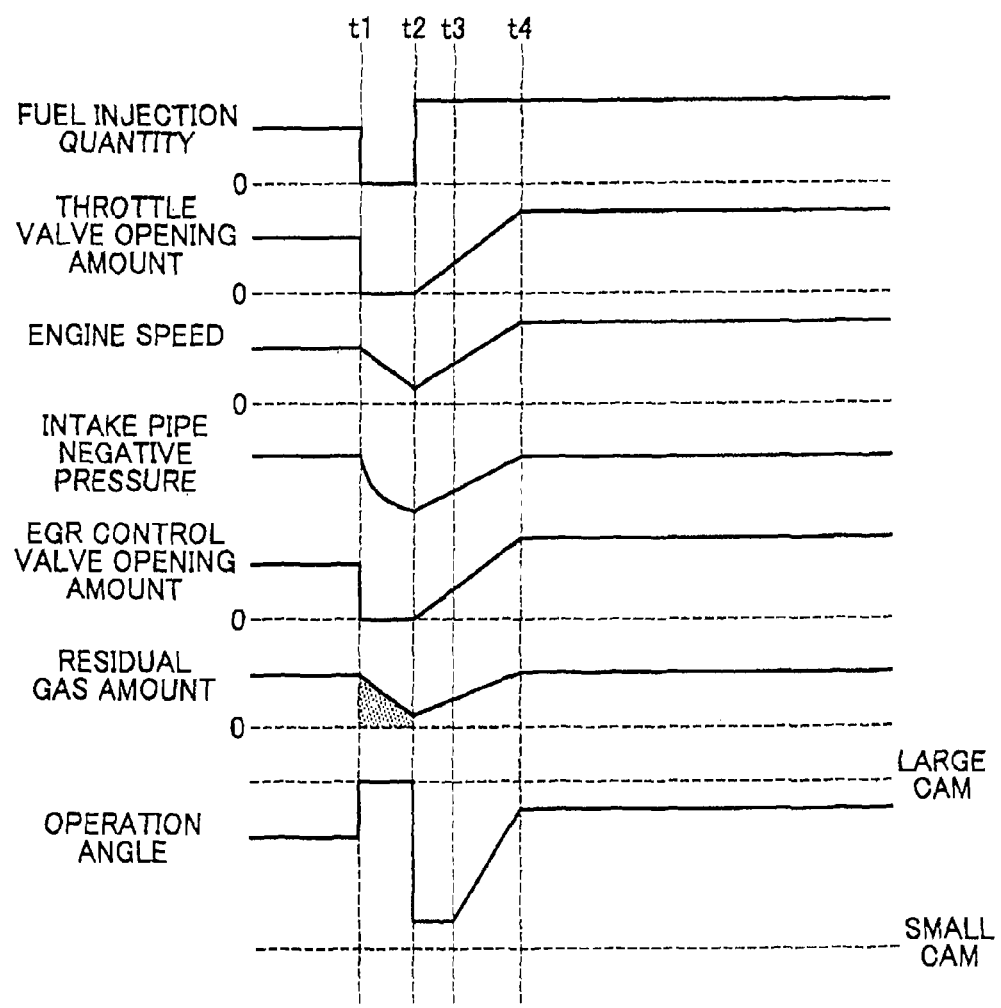
FIG. 7 is a graph showing control of the valve timing over time according to the example embodiment of the invention.
Figure 8:
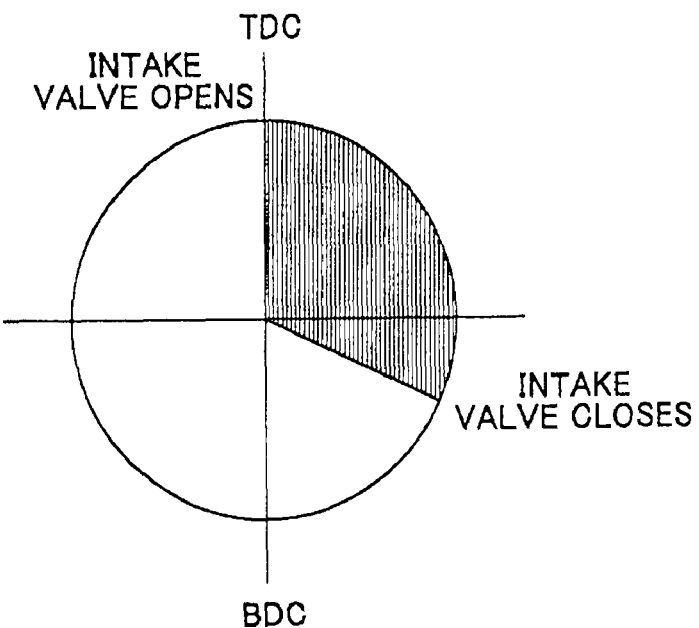
FIG. 8 is a graph showing the valve timing before a fuel cut according to the example embodiment of the invention.
Figure 9:
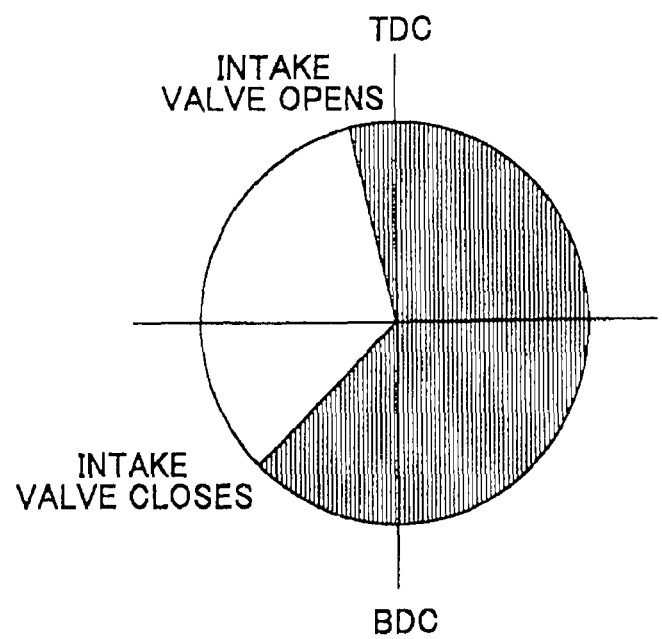
FIG. 9 is a graph showing the valve timing during a fuel cut according to the example embodiment of the invention.
Figure 10:
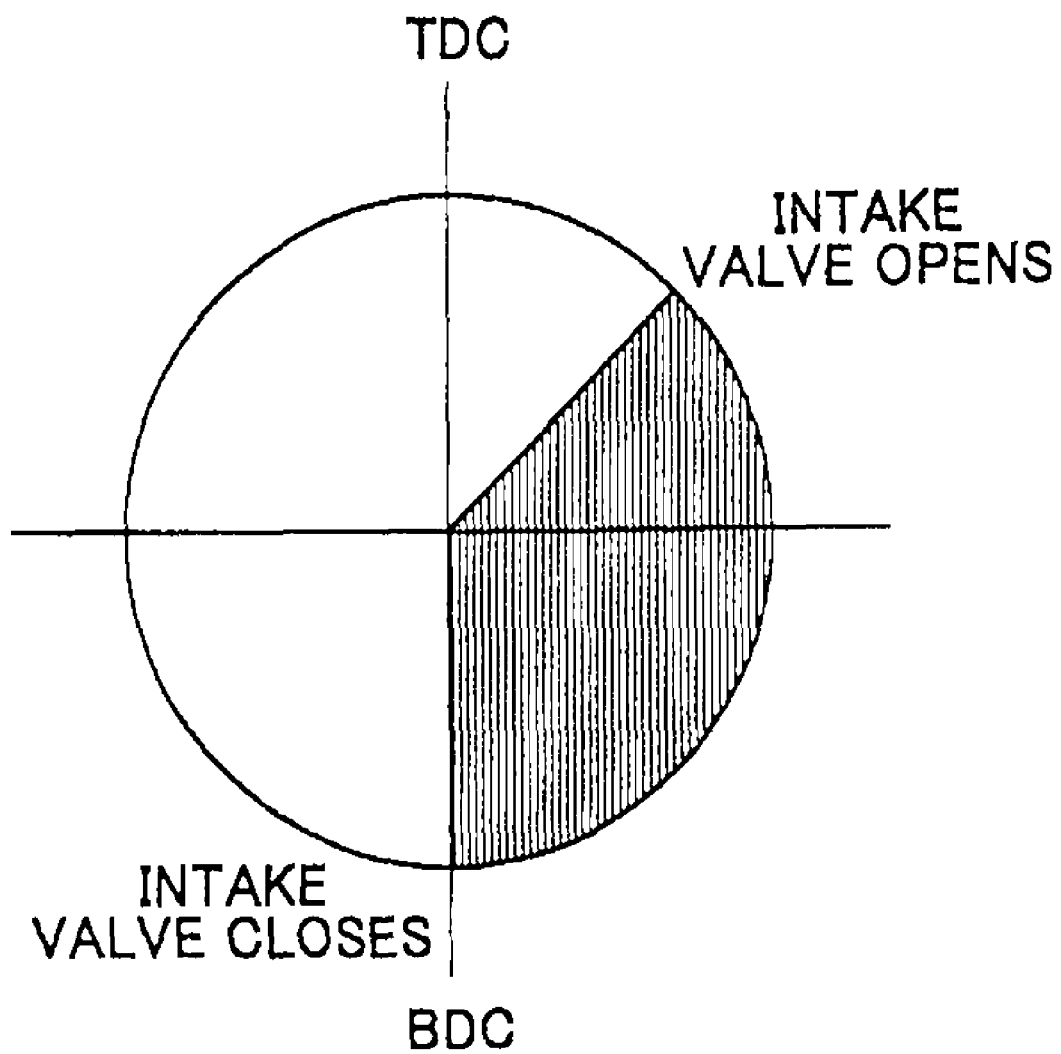
FIG. 10 is a graph showing the valve timing when returning from a fuel cut according to the example embodiment of the invention.

Once either the engine 200 reaches the restoration speed or the vehicle is accelerated again, the fuel cut and the control to stop exhaust gas recirculation are cancelled (step S9). Continuing on, the ECU 100 actually controls the intake valve 208 so that the valve timing comes to match the valve timing calculated in step S5. The valve timing control will now be described in detail together with the actual running state of the vehicle with reference to FIGS. 7 to 10. FIG. 7 is a graph showing the valve timing control over time, FIG. 8 is a graph showing the valve timing before a fuel cut, FIG. 9 is a graph showing the valve timing during a fuel cut, and FIG. 10 is a graph showing the valve timing when returning from a fuel cut.

In the example shown in FIG. 7, a steadily running vehicle decelerates such that a fuel cut is performed at time t1. Up until time t1, the intake valve 208 operates at a valve timing such as that shown in FIG. 8. That is, the vehicle is running in a state where the valve opening timing is at top dead center (TDC) of the piston 203 such that there is little pumping loss so the engine 200 operates relatively efficiently.

When the opening amount of the throttle valve 214 becomes 0 at time t1, a fuel cut is initiated such that fuel stops being injected from the fuel injector 207 (i.e., the fuel injection quantity becomes 0) and the opening amount of the EGR control valve 227 becomes 0. As a result, the speed of the engine 200, the negative pressure in the intake pipe 206, and the amount of residual gas in the cylinder 201 all decrease over time. The valve timing of the intake valve 208 at this time is controlled as shown in FIG. 9. That is, the operation angle is controlled to increase such that the feeling of the engine brake becomes more apparent in the vehicle. Incidentally, the duration of this kind of fuel cut is typically on the order of several seconds.

Next, from time t2 to time t4, the engine is accelerated in such a manner that the opening amount of the throttle valve gradually increases. First at time t2, the fuel cut is cancelled such that fuel starts to be injected from the fuel injector 207. The EGR control valve 227 is also opened so that the amount of residual gas increases. Moreover, the speed of the engine 200, which has decelerated, and the negative pressure in the intake pipe 206 also increase.

The valve timing of the intake valve here is controlled as shown in FIG. 10 from time t2 to time t3 (i.e., during the period calculated in step S6 described above). That is, the flow in the cylinder 201 is strengthened and the actual compression ratio is increased by controlling the valve opening timing so that it is retarded with respect to TDC and controlling the valve closing timing so that it approaches BDC of the piston 203. Accordingly, if the residual gas amount is not 0 at time t2 (see the shaded portion in FIG. 7), the combustion state that has deteriorated can be improved. Incidentally, even though control such as that shown in FIG. 10 typically reduces fuel efficiency, it can actually improve the overall fuel efficiency when the fact that it improves the combustion state is taken into account.

Once the period of time during which the valve timing is maintained has passed (i.e., once time t3 passes), the valve timing of the intake valve 208 then returns to the steady running state at time t4, after which the operation ends.

As described above, the internal combustion engine control apparatus according to this example embodiment makes it possible to improve the combustion state in the cylinder when it has deteriorated due to residual gas, by strengthening the flow in the cylinder and increasing the actual compression ratio when a fuel cut is cancelled. Furthermore, control that takes the amount of residual gas into account can be performed so the effects described above can be enhanced even more.

In this example embodiment, the intake valve 208 is used as flow adjusting means but the invention is not limited to this. That is, the flow adjusting means may also include an exhaust valve instead of or in addition to the intake valve 208. Alternatively, the flow adjusting means may include an intake control valve in addition to the intake valve 208. Also, instead of or in addition to the intake valve 208 or the exhaust valve, the flow adjusting means may use, for example, a mechanism especially for controlling the swirl flow, such as a swirl control valve, or a mechanism especially for controlling the tumble flow, such as a tumble control valve. Furthermore, the flow adjusting means is not limited to a valve. That is, any mechanism or means for changing parameters may be used as long as it can selectively increase and reduce the strength of the flow within the cylinder.

Moreover, in the control of the opening and closing timing of the intake valve 208 or the exhaust valve described above, not only advance or retard control, but also lift amount control is possible. Also, instead of or in addition to changing the valve opening timing and the valve closing timing, the period during which the changed valve opening timing and the valve closing timing are maintained can also be controlled.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

The invention claimed is:

1. An internal combustion engine control apparatus comprising:
   a fuel supplying portion supplying fuel to the internal combustion engine;
   an exhaust gas recirculating portion recirculating exhaust gas of the internal combustion engine to an intake side of the internal combustion engine;
   a flow adjusting portion selectively increasing and decreasing a strength of flow of the supplied fuel and the recirculated exhaust gas in a cylinder of the internal combustion engine;
   a stop controlling portion controlling the fuel supplying portion to stop the supply of fuel and controlling the exhaust gas recirculating portion to stop the recirculation of exhaust gas, when the internal combustion engine is operated in a predetermined deceleration mode;
   an in-cylinder flow controlling portion controlling the flow adjusting portion to increase the strength of the flow when the control to stop the supply of fuel is cancelled; and
   a first residual exhaust gas amount calculating portion calculating a first residual exhaust gas amount which is the amount of the recirculated exhaust gas remaining in the cylinder, when the control to stop the supply of fuel is cancelled,
   wherein the in-cylinder flow controlling portion controls the flow adjusting portion according to the first residual exhaust gas amount.

2. The internal combustion engine control apparatus according to claim 1, further comprising an engine restoration speed considering portion determining whether the engine has reached a restoration speed at which operation of the engine can no longer be maintained unless the fuel cut is cancelled, and, when the engine has reached the restoration speed, returning the engine from the predetermined deceleration mode without accelerating again.

3. The internal combustion engine control apparatus according to claim 1, wherein the flow adjusting portion includes an intake valve which is provided on the intake side of the internal combustion engine and structured so as to be able to change at least one valve timing from among of a valve opening timing and a valve closing timing; the supplied fuel and the recirculated exhaust gas flow into the cylinder via the intake valve; and the in-cylinder flow controlling portion changes at least one valve timing from among the valve opening timing and the valve closing timing to increase the strength of the flow.

4. The internal combustion engine control apparatus according to claim 3, wherein the in-cylinder flow controlling portion retards the valve opening timing to increase the strength of the flow.

5. The internal combustion engine control apparatus according to claim 3, wherein the in-cylinder flow controlling portion retards the valve opening timing with respect to top dead center to increase the strength of the flow.

6. The internal combustion engine control apparatus according to claim 3, wherein the in-cylinder flow controlling portion shifts the valve closing timing toward bottom dead center of the piston of the internal combustion engine to increase the strength of the flow.

7. The internal combustion engine control apparatus according to claim 3, wherein the in-cylinder flow controlling portion sets the period of time during which the valve opening timing and the valve closing timing when the control to stop the supply of fuel is cancelled are maintained.

8. The internal combustion engine control apparatus according to claim 7, wherein the in-cylinder flow controlling portion calculates the period of time based on the first residual exhaust gas amount.

9. The internal combustion engine control apparatus according to claim 1, further comprising a second residual exhaust gas amount calculating portion calculating a second residual exhaust gas amount which is the amount of the recirculated exhaust gas remaining in the cylinder right before the supply of fuel is stopped, wherein the first residual exhaust gas amount calculating portion calculates the first residual exhaust gas amount based on the second residual exhaust gas amount.

10. The internal combustion engine control apparatus according to claim 9, wherein the exhaust gas recirculating portion includes a recirculation valve with an adjustable opening amount, and selectively changes the amount of recirculated exhaust gas by changing the opening amount of the recirculation valve, and the second residual exhaust gas amount calculating portion calculates the second residual exhaust gas amount based on the opening amount of the recirculation valve.

11. The internal combustion engine control apparatus according to claim 9, wherein the first residual exhaust gas amount calculating portion calculates the first residual exhaust gas amount based on the second residual exhaust gas amount and the number of cycles of the piston of the internal combustion engine while the supply of fuel is stopped.

12. The internal combustion engine control apparatus according to claim 9, wherein the first residual exhaust gas amount calculating portion calculates the first residual exhaust gas amount based on the second residual exhaust gas amount and the period of time during which the supply of fuel is stopped.

13. The internal combustion engine control apparatus according to claim 12, wherein the first residual exhaust gas amount calculating portion calculates the first residual exhaust gas amount based on the second residual exhaust gas amount and the amount of air supplied to the internal combustion engine while the supply of fuel is stopped.

14. The internal combustion engine control apparatus according to claim 12, wherein the first residual exhaust gas amount calculating portion calculates the first residual exhaust gas amount based on the second residual exhaust gas amount and the revolution count of the internal combustion engine while the supply of fuel is stopped.

15. The internal combustion engine control apparatus according to claim 9, wherein the first residual exhaust gas amount calculating portion calculates the first residual exhaust gas amount based on the second residual exhaust gas amount and the amount of air supplied to the internal combustion engine while the supply of fuel is stopped.

16. The internal combustion engine control apparatus according to claim 9, wherein the first residual exhaust gas amount calculating portion calculates the first residual exhaust gas amount based on the second residual exhaust gas amount and the revolution count of the internal combustion engine while the supply of fuel is stopped.

17. The internal combustion engine control apparatus according to claim 1, wherein the stop controlling portion is adapted to independently perform i) control on the fuel supplying portion to stop the supply of fuel and ii) control on the exhaust gas recirculating portion to stop the recirculation of exhaust gas.

18. The internal combustion engine control apparatus according to claim 1, wherein the in-cylinder flow controlling portion controls the flow adjusting portion so that the larger the calculated first residual exhaust gas amount is, the more the strength of the flow is increased.

19. An internal combustion engine control method of controlling an internal combustion engine provided with a fuel supplying portion for supplying fuel to the internal combustion engine; an exhaust gas recirculating portion for recirculating exhaust gas of the internal combustion engine to an intake side of the internal combustion engine; and a flow adjusting portion for selectively increasing and decreasing a strength of flow of the supplied fuel and the recirculated exhaust gas in a cylinder of the internal combustion engine, the method comprising:

controlling the fuel supplying portion to stop the supply of fuel and controlling the exhaust gas recirculating portion to stop the recirculation of exhaust gas, when the internal combustion engine is operated in a predetermined deceleration mode;

controlling the flow adjusting portion to increase the strength of the flow when the control to stop the supply of fuel is cancelled;

calculating a first residual exhaust gas amount which is the amount of the recirculated exhaust gas remaining in the cylinder, when the control to stop the supply of fuel is cancelled; and controlling the flow adjusting portion according to the first residual exhaust gas amount.

20. The method according to claim 19, further comprising:

determining whether the engine has reached a restoration speed at which operation of the engine can no longer be maintained unless the fuel cut is cancelled, then returning the engine from the predetermined deceleration mode without accelerating again.

* * * * *